(12) United States Patent
Searle et al.

(10) Patent No.: US 11,685,598 B2
(45) Date of Patent: Jun. 27, 2023

(54) REFUSE COLLECTION SYSTEM

(71) Applicant: Bucher Municipal Pty Ltd, Victoria (AU)

(72) Inventors: Andrew Peter Searle, Victoria (AU); Andrew Garry Mitchell, Victoria (AU); Lewis Luyken, Victoria (AU)

(73) Assignee: Bucher Municipal Pty Ltd, Victoria (AU)

( * ) Notice: Subject to any disclaimer, the term of this patent is extended or adjusted under 35 U.S.C. 154(b) by 502 days.

(21) Appl. No.: 16/636,193

(22) PCT Filed: Aug. 10, 2018

(86) PCT No.: PCT/AU2018/050849
§ 371 (c)(1),
(2) Date: Feb. 3, 2020

(87) PCT Pub. No.: WO2019/028528
PCT Pub. Date: Feb. 14, 2019

(65) Prior Publication Data
US 2020/0369468 A1 Nov. 26, 2020

(30) Foreign Application Priority Data

Aug. 11, 2017 (AU) .................. 2017903210

(51) Int. Cl.
*G01S 13/86* (2006.01)
*B65F 1/14* (2006.01)
(Continued)

(52) U.S. Cl.
CPC .............. *B65F 1/1484* (2013.01); *B65F 3/00* (2013.01); *G01S 13/42* (2013.01); *G01S 13/867* (2013.01);
(Continued)

(58) Field of Classification Search
CPC .......... B65F 1/1484; B65F 3/00; G01S 13/42; G01S 13/867; G01S 13/88; G01S 17/06;
(Continued)

(56) References Cited

U.S. PATENT DOCUMENTS

| 9,403,278 B1 * | 8/2016 | Van Kampen ............ G06T 7/12 |
| 2009/0108065 A1 | 4/2009 | King et al. |

(Continued)

FOREIGN PATENT DOCUMENTS

| EP | 1674411 A1 * | 6/2006 | ............... B65F 3/00 |
| WO | 2017/079791 | 5/2017 | |

OTHER PUBLICATIONS

International Search Report issued in related PCT/AU2018/050849, dated Sep. 21, 2028.

*Primary Examiner* — Timothy A Brainard
(74) *Attorney, Agent, or Firm* — Barnes & Thornburg LLP; Jeffrey R. Stone

(57) ABSTRACT

The technology relates to a refuse collection system including: a camera configured to capture image data; a sensor configured to capture spatial data; and a processing module in communication with the camera and the sensor, the processing module configured to: process the image data to assist in identifying an object; and process the spatial data in a region associated with the object in order to determine one or more characteristics associated therewith, wherein in response to confirming that the object is a bin based on the one or more characteristics associated with the object, the processing module is configured to provide information to assist in retrieving the bin with a bin-collecting device.

21 Claims, 5 Drawing Sheets

(51) Int. Cl.
*G01S 17/86* (2020.01)
*B65F 3/00* (2006.01)
*G01S 13/42* (2006.01)
*G01S 13/88* (2006.01)
*G01S 17/06* (2006.01)
*H04N 7/18* (2006.01)
*G06V 20/56* (2022.01)
*G06V 10/778* (2022.01)
*G06V 10/25* (2022.01)

(52) U.S. Cl.
CPC .............. *G01S 13/88* (2013.01); *G01S 17/06* (2013.01); *G01S 17/86* (2020.01); *G06V 10/7788* (2022.01); *G06V 20/56* (2022.01); *H04N 7/183* (2013.01); *G06V 10/25* (2022.01); *G06V 2201/07* (2022.01)

(58) Field of Classification Search
CPC . G01S 17/86; G06T 2207/10024; G06T 7/73; G06V 10/25; G06V 20/56; G06V 2201/07; H04N 7/18; H04N 7/183; H04N 9/045; G06K 9/6254
See application file for complete search history.

(56) References Cited

U.S. PATENT DOCUMENTS

| | | | |
|---|---|---|---|
| 2010/0063954 A1* | 3/2010 | Anderson | G05D 1/0274 706/50 |
| 2013/0245822 A1 | 9/2013 | Kawanami et al. | |
| 2017/0011364 A1* | 1/2017 | Whitman | G06K 7/10316 |
| 2017/0127652 A1* | 5/2017 | Shen | G05D 1/12 |
| 2017/0243363 A1* | 8/2017 | Rodoni | B65F 3/001 |
| 2018/0072212 A1* | 3/2018 | Alfaro | B60K 7/0007 |

* cited by examiner

REFUSE COLLECTION SYSTEM

FIELD OF THE INVENTION

The invention relates to a refuse collection system. In particular, the invention relates, but is not limited, to a refuse collection system to provide automation of bin collection by a refuse collection vehicle.

BACKGROUND OF THE INVENTION

Any reference to background art herein is not to be construed as an admission that such art constitutes common general knowledge in Australia or elsewhere.

Several different types of refuse collection vehicles are used in collecting municipal waste, including rear loading, front loading and side loading vehicles. In the case of side loading and front loading refuse collection vehicles, these typically require a vehicle driver to determine the location of a bin, suitably position the vehicle to collect the bin and then control a bin-collecting device to retrieve the bin, empty its content and return it to the kerbside. As will be appreciated, efficiency can be limited through this manual process, as the refuse collection operation is almost wholly reliant on the speed of the decisions and actions of the vehicle driver.

Allied to these problems, there can be a high cognitive load on the driver, who must concentrate on many different things, including aligning and positioning the vehicle, checking for pedestrians and obstacles such as other vehicles in the vicinity, and operating the bin collection mechanism at the right time and in the right way. Lapses in operator concentration can be hazardous. Accordingly, approaches that can allow reduction of the overall cognitive load on the driver can potentially provide substantial safety benefits.

Automation of refuse collection operations is gradually evolving, but finding solutions for reliable retrieval of bins—particularly in residential environments—is proving difficult. Falsely identifying objects as bins can lead to damage to property and raise other safety concerns for pedestrians and others. Systems for automated refuse collection operations also need to work in real-time and bins therefore need to be quickly identified and reliably tracked. Further, the operating environment for a refuse collection vehicle is constantly changing. By way of example, refuse collection automation systems need to adapt to changing lighting conditions as, for instance, night shifts into day during early morning rubbish collection. Furthermore, surrounding obstacles or objects will vary at each collection location and the bin must be collected safely whilst navigating these surrounding obstacles and objects.

SUMMARY OF THE INVENTION

In one aspect, although not necessarily the only or broadest aspect, the invention resides in a refuse collection system including:
   a camera configured to capture image data;
   a sensor configured to capture spatial data; and
   a processing module in communication with the camera and the sensor, the processing module configured to:
      process the image data to assist in identifying an object; and
      process the spatial data in a region associated with the object in order to determine one or more characteristics associated therewith,
   wherein in response to confirming that the object is a bin based on the one or more characteristics associated with the object, the processing module is configured to provide information to assist in retrieving the bin with a bin-collecting device.

The combination of using the image data to assist with processing the spatial data (or vice versa), in respect of a region identified as potentially containing a bin, assists with confirming that a bin is present with a substantially higher degree of confidence. This is important, as it reduces the risk of false alerts to the system. Moreover, as discussed further below, the spatial data, in addition to providing the additional confidence that a bin is present, is also used in determining the position and/or orientation of the bin. The position and/or orientation information is then used to provide the guidance data required to enable the bin retrieval operation with the bin-collecting device.

The bin retrieval operation as used in this specification refers to the process from bin pickup to bin return, i.e. the sequence of seizing a bin with a bin-collecting device (such as an articulated arm carrying a bin-grabbing means), lifting the bin and inverting it over a collection hopper of a waste container of the refuse collection vehicle, so to empty its contents, and returning the bin to the ground, generally at or close to the position from where it was lifted. In addition, a bin may be construed as a receptacle in which to deposit rubbish. In further aspects, the bin may be a wheelie bin or the alike.

In an embodiment, the processing module is configured to determine the region associated with the bin based on the image data and/or spatial data.

The camera and sensor may be provided in an integrated unit. Alternatively, they may be provided as separate units.

In an embodiment, the spatial information includes 3D information, such as a 3D point cloud or a range image.

In an embodiment, the processing module is configured to compare and/or corroborate detections and/or locations of the object in order to determine one or more characteristics associated therewith.

In a preferred embodiment, the processing module is configured to process the image data by passing the image data through an object detection algorithm. Upon identifying a bin within the image data, the corresponding object is identified within the spatial data. The processing module may thereafter confirm the bin geometry and the location of the bin. This process allows for the identification of bins which have been obscured through paint or other non-standard markings whilst preventing confusion with other bins placed behind obscuring objects.

In an embodiment, the processing module is configured to process the image data by comparing it with one or more prescribed features. A prescribed feature may be known as a prescribed classifier. Multiple features may be utilised together to define a more robust prescribed classifier. In response to a sub-region of the image data providing a sufficient match with the one or more prescribed features, the processing module is able to determine that a bin is present in that sub-region of the image data.

In an embodiment, in order to compare the image data with one or more prescribed features, the processing module is configured to search the image data for a prescribed feature vector. This assists with analysing the image data relatively quickly for objects which resemble a bin. In an embodiment, in response to a sufficient match between the prescribed feature vector and a sub-region of the image data, the processing module is configured to determine that a bin is present in that sub-region of the image data.

In a further embodiment, the prescribed feature vector may be trained to classify objects as a bin through a process of machine learning using a large labelled image dataset. In use, each new image collected by the camera is split into sub-regions and compared to the trained feature vector and, in response to a sub-region of the image data providing a sufficient match with the trained feature vector, the processing module is able to determine that a bin is present in that sub-region of the image data. Advantageously, the processing module may search the image data for multiple different trained feature vectors. In this way, it is possible to, for example, search the image data and identify different bin types.

In an embodiment, the object detection algorithm includes convolutional neural networks. In this regard, features relevant to identifying a bin in the image data are not pre-defined by a human but by training the neural network with a large labelled image dataset. In this way, the neural network learns which features are salient to identify a bin. Furthermore, with sufficient labelling of the image dataset, it is possible for the neural network to learn to locate and differentiate different types of bins. Upon completion of the training, weights and biases determined by the neural network are frozen, i.e. the neural network cannot learn any longer. In an embodiment, each new image captured from the camera is passed through the frozen classifier and, if a portion of the image data contains a sufficient match to a learned abstraction of a bin type (e.g. general waste bin, recycling bin, green waste bin, or other type of bin), then the processing module is able to determine that a particular type of bin is present in that portion of the image data.

In an embodiment, the processing module may be configured such that multiple classes of object can be detected and identified by the object detection algorithm. For example, in addition to detecting and identifying bins, the object detection algorithm may detect and identify objects surrounding the bin.

In an embodiment, the image data is converted into greyscale data for scanning for the prescribed feature (e.g. the feature vector). This reduces the processing power required in analysing the image data as only one greyscale channel is scanned (rather than three separate colour channels). In a further form (where further processing power is readily available), the image data may be processed in colour to provide additional information in classifying the bin.

In an alternative, semi-automated form of the refuse collection system, the processing module processes the image data by presenting to a user a selectable representation associated with the identified object, to allow user confirmation. In one form, the user (e.g. the driver of a vehicle equipped with the refuse collection system) is presented with a highlighted region on an image screen, the highlighted region identified by the processing module as being a bin. The user can then make a selection by way of a user interface to confirm that the object is indeed a bin. For example, the user may touch the highlighted region on a touchscreen image display in order to confirm that the object is a bin.

In an embodiment, the one or more characteristics associated with the object (as determined from the spatial data) include one or more geometrical features. These may be features of shape and/or dimension(s) of the object. For example, different bin types may be differentiated based upon bin volume.

In an embodiment, in order to confirm the object is a bin based on the one or more characteristics associated with the object, the processing module compares the one or more characteristics with one or more prescribed characteristics.

In an embodiment, the processing module is configured such that, in response to determining that the one or more characteristics have a sufficient match with the one or more prescribed characteristics, it confirms the object to be a bin.

In a further embodiment, the one or more prescribed characteristics may be established by a process of machine learning applied to a large spatial data set. In this regard, searching for the prescribed feature vector and/or prescribed characteristic may be carried out sequentially or together based on the image data and spatial data.

In a further embodiment, the spatial data may be analysed using a convolutional neural network. Salient geometric features may be learnt by training the neural network with a large labelled spatial dataset. Upon completion of training, weights and biases determined by the neural network may be frozen. In use, each new spatial data snapshot captured by the spatial sensor is passed through the frozen classifier and, if a region of the spatial data set contains a sufficient match to a learned abstraction of a bin, the processing module may indicate that a bin is present in that region.

In a further embodiment, the image data and the spatial data may be combined and one or more prescribed characteristics may be established by training a prescribed classifier or by training a neural network. In this regard, searching for objects pertaining to a bin may be carried out sequentially or together based on the image data and the spatial data.

In a further embodiment, the spatial data may be used to create a 3D map of the bin and any surrounding objects. In this regard, it is possible to determine the location of the surrounding objects and thereby a safe path to collect a bin which avoids the surrounding objects. Though it is possible, it is no necessary to classify the surrounding objects to determine the route. Furthermore it is possible to use the 3D map to find a suitable place to replace the bin once emptied.

In an alternative semi-automated form of the refuse collection system, in order to confirm the object is a bin based on the one or more characteristics associated with the object, the processing module is configured to present to a user image data providing a selectable representation associated with the object, the selectable representation determined from the one or more characteristics associated with the object, to allow user verification that the object is a bin. The representation may include the outline of the bin. For example, the user may be presented with a bin outline presented on an image screen, and the user can then make a selection by way of a user interface (i.e. a touch screen, button, joystick etc.) to confirm that the object is indeed a bin. This additional confirmation may assist in avoiding false positives where an object has been misclassified by the user and/or by the software.

In an embodiment, in response to confirming that an object is a bin, the processing module is configured to determine the type of bin, e.g. a general waste bin, a recycling bin, or a green waste bin. This may be done on the basis of the one or more characteristics. For example, the shape, colour and/or size of the bin may be determined. Preferably, a user may select a particular bin type to be collected by the refuse collection system via the user interface. The selected bin type may be preferentially highlighted on the display.

In an embodiment, if the user indicates that the detection algorithm has made an error, the image data and the spatial data may be stored for later refinement of the object detection algorithm.

Additionally or alternatively, the processing module may be configured to use the image data to determine the type of bin. For example, processing of the image data to determine the type of bin may be carried out based on the level of ambient light. More particularly, in response to the ambient light being above a prescribed level, the image data may be processed on the basis of colour data.

In an embodiment, the processing of the colour data includes changing the image colour space. In an embodiment, the colour space is changed from Red, Green, and Blue (the data as transmitted from the camera) to Hue, Saturation, and Value. The type of bin is determined by comparing the histogram of hue values with one or more prescribed hue values. Using a predetermined hue value, as opposed to detected colours, assist in overcoming issues associated with colour intensities changing with lighting conditions.

In an embodiment, in response to the ambient light being below a prescribed level, the image data is converted to a grayscale image.

In an embodiment, in response to converting the image data into a grayscale image, the processing module is configured to classify the type of bin by comparing the grey scale image with one or more threshold parameters.

In an embodiment, to optimise the search for the one or more threshold parameters, a lower portion of the bin is utilised to generate one or more reference points of grey scale intensities in the image data. By way of example, on a run with bins having different lid colours (i.e. recycling (yellow lid) and green waste (light green lid)), the greyscale intensities may return similar results depending upon the ambient lighting conditions at night. To overcome this problem, the processing module may use the greyscale intensity of the lower portion of the bin, the lower portion of bins normally being identical in colour and, therefore, providing a consistent grey scale reference point. If the lower portion of the bin in the image data indicates a percentage change in lighting levels, this can be applied as a calibration to the relevant image data to assist in comparing with the one or more threshold parameters.

In a preferred embodiment, the refuse collection system includes one or more lights configured to illuminate a work area associated with the refuse collection system to thereby assist the processing module in determining the one or more characteristics associated with the object, such as the bin type.

In an embodiment, the sensor configured to collect spatial data does so in two or more dimensions. For example, the sensor may comprise a stereo camera, laser scanner, RADAR or a range sensor means. Preferably, the sensor produces 2.5D or 3D spatial data.

In an embodiment, the image data and the spatial data are aligned via a calibration routine. The calibration routine may include overlaying the image data with the spatial data and adjusting as required to arrive at a common field of view.

The calibration routine may be carried out as a factory setup, or maybe adjusted when required (e.g. as part of a regular maintenance program). Alternatively, the calibration routine may be carried out automatically under control of a software program.

In an embodiment, the one or more characteristics associated with the object includes a position of the bin. In a further embodiment, the one or more characteristics associated with the object also includes positions of objects surrounding the bin.

In an embodiment, based on the position of the bin and other objects surrounding the bin, the processing module is configured to determine information concerning a path to the bin for movement of a bin-collecting device, and in particular whether there is a clear path for the bin-collecting device to engage the bin. The processing module may use the image data and/or the spatial data to determine the presence of an obstacle in a prescribed path of the bin-collecting device, which may interfere with the engagement of the bin.

In an embodiment, in response to determining that the prescribed path for the bin-collecting device to retrieve the bin is not clear, the processing module is configured to determine or select an alternative path for the bin-collecting device to engage the bin. Hence, the prescribed path for movement of the bin-collecting device may initially be a substantially direct path, but if that is determined not be clear, the alternative path becomes the prescribed path.

In an embodiment, the processing module is configured to provide information concerning the position of the bin and of objects surrounding the bin to a bin retrieval control module of the refuse collection system, to determine a safe prescribed path to be used in a bin retrieval operation. The objects surrounding the bin may be obstacles that must be avoided by the bin-collecting device to safely retrieve the bin.

The processing module may be configured to provide a motion profile to the bin retrieval control module, based on the prescribed path, in order to control movement of the bin-collecting device.

In the event the processing module is unable to determine a clear path to the bin for movement of a bin-collecting device, the bin retrieval control module is prevented from carrying out a bin retrieval operation, and a suitable warning (visual and/or audible) may be provided to the user.

In an embodiment, the refuse collection system is provided on a refuse collection vehicle, and the bin retrieval control module is configured to return a bin to its original position, provided the refuse collection vehicle has not moved more than a prescribed distance from bin pickup, and/or provided the drop off path for movement of the bin-collecting device is determined to be clear.

In an embodiment, the bin retrieval control module is configured such that, if the refuse collection vehicle has moved more than the prescribed distance from bin pickup, and/or the drop off path is determined not to be clear, the bin is returned to a different suitable position determined by the processing module and/or the user.

In another aspect, the invention resides in a refuse collection system including:
  a camera configured to capture image data;
  a sensor configured to collect spatial data; and
  a processing module in communication with the camera and the sensor, the processing module configured to:
    process the image data in order to assist in identifying an object;
    determine a region associated with the object; and
    process the spatial data in the region associated with the object in order to determine one or more characteristics associated therewith,
  wherein in response to confirming that the object is a bin, the processing module is configured to assist in retrieving the bin based on the one or more characteristics associated with the object.

Like the previous aspect, it will be appreciated that confirming the object is a bin in this aspect may be based on the image data and/or the spatial data. In this regard, it is possible to process the image data and spatial data sequentially or together, relying on the indicator(s) in each data set, to confirm that the object is a bin. The region associated with the object may then be used to determine the one or more characteristics associated therewith (i.e. its location) to assist in retrieving the bin.

With the above in mind, the processing power required in identifying an object may be reduced by giving preference to one data set over another. That is, the processing module can be configured such that it may search for potential bins in a primary dataset and, upon identifying a potential bin, can then verify the object is a bin in the secondary dataset. The primary and secondary data sets may be either the image or spatial data depending on the complexity of the data sets.

In another aspect the invention resides in a refuse collection vehicle, the vehicle including:

a refuse collection device having a bin-collecting device configured to collect a bin; and a refuse collection system as defined above.

In another aspect the invention resides in a method for collecting a bin, the method including:

retrieving image data;

retrieving spatial data;

processing the image data to assist in identifying an object;

processing the spatial data in order to assist in confirming that the object is a bin; and providing information to assist with retrieving the bin with a bin-collecting device.

In an embodiment, the method is as herein described.

In an embodiment, the method further includes combining the image data and the spatial data to form one data set that is processed to confirm that the object is a bin.

In an embodiment, the image data is stored and processed as a multidimensional array. In a further embodiment, the spatial data is also stored and processed as a multidimensional array. The step of combining the image data and the spatial data includes creating a larger multidimensional array. This array is then analysed for features pertaining to a bin.

In an embodiment, the step of processing the spatial data in order to confirm that the object is a bin includes identifying a region of spatial data for processing based on the location of the object in the image data.

In an embodiment, the step of providing information to assist with retrieving the bin with the bin-collecting device includes providing the position of the bin and the position of objects surrounding the bin. The objects surrounding the bin may be obstacles that must be avoided by the bin-collecting device to safely retrieve the bin.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE EMBODIMENTS

Figure 1:
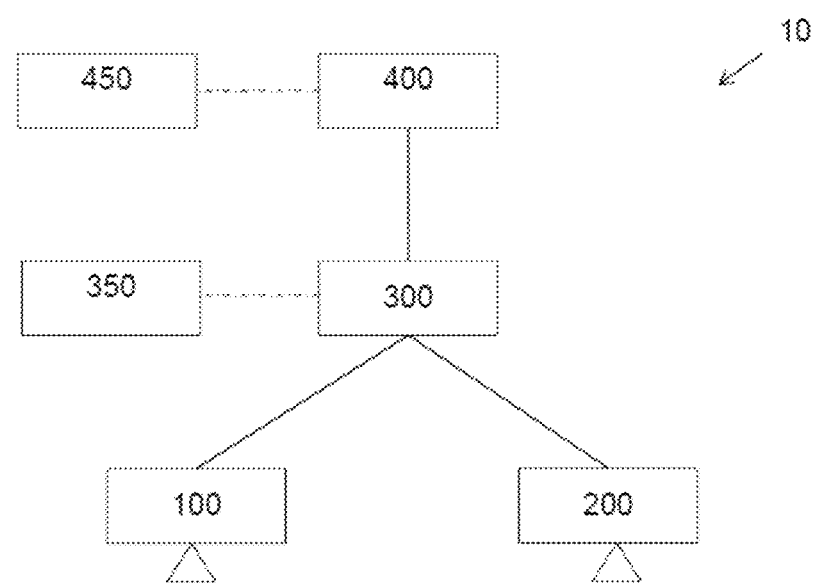
FIG. 1 illustrates a schematic diagram of a refuse collection system, according to an embodiment of the invention.
Figure 2:
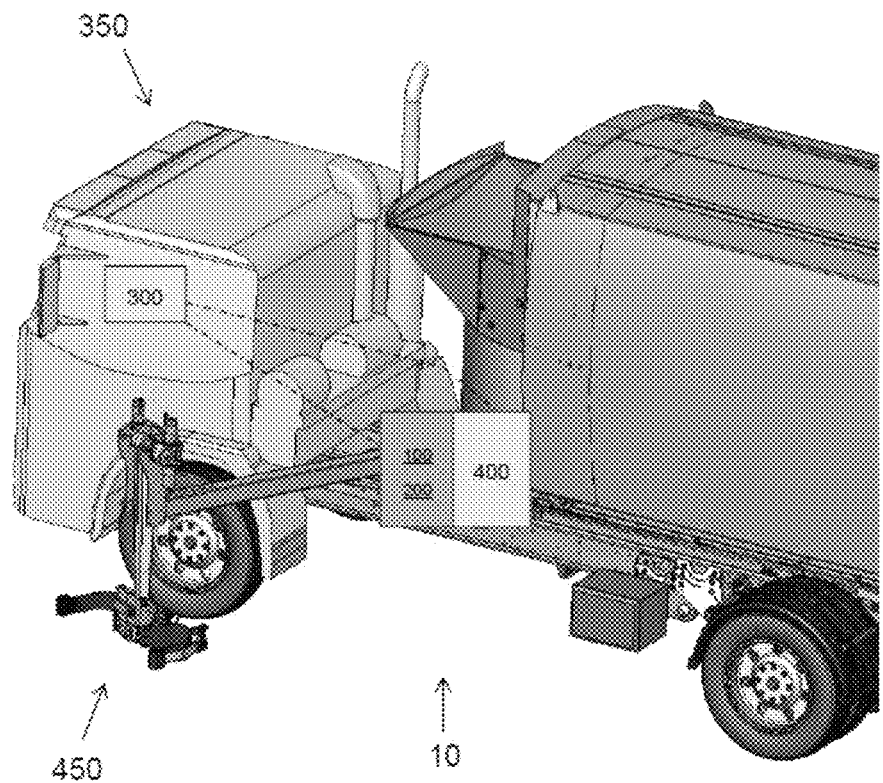
FIG. 2 illustrates a refuse collection vehicle including the refuse collection system of FIG. 1, according to an embodiment of the invention.

The refuse collection system 10, shown in FIG. 1, includes a camera 100, a spatial sensor 200, a processing module 300 and a bin retrieval control module 400. As further shown in FIG. 2, the system 10 is readily fitted to a refuse collection vehicle 350 with a bin-collecting device 450. Although not illustrated, the refuse collection system 10 also includes one or more lights configured to illuminate a work area associated with the refuse collection system 10. The one or more lights can include an infrared light.

The camera 100 in this embodiment comprises a video camera, which captures image data and communicates it to processing module 300. In use, image data is provided to processing module 300 on a continuous basis. Camera 100 is mounted on the refuse collection vehicle 350 in a suitable position and orientation to afford a viewing area associated with a zone of potential movement of a bin-collecting device 450. That is, the camera 100 is positioned to view the area where the bin-collecting device 450 is able to operate to engage bins. Furthermore, camera 100 is mounted at an angle such that it can view approaching bins, in its field of view, as refuse collection vehicles 350 moves along the road.

In this embodiment, spatial sensor 200 is a 2.5D sensor, such as an IFM O3M series sensor. The 2.5D sensor includes 3D related information. Furthermore, it will be understood that the camera 100 and spatial sensor 200 in this embodiment may be integrated into a single unit, potentially sharing data. In alternative embodiments, other forms of spatial sensor equipment may be employed, such as a laser scanner, RADAR, LIDAR unit, an echolocation unit, a range camera, a holographic unit, or any other suitable device able to acquire the information needed to provide the required spatial characteristic(s), as discussed below.

Spatial sensor 200 communicates spatial data to processing module 300. In use, spatial sensor 200 is also mounted on the refuse collection vehicle to afford a viewing area associated with a zone of potential movement of a bin-collecting device. That is, spatial sensor 200 is positioned to view the area where the bin-collecting device 450 is able to operate to engage bins. Before use, the image data from the camera 100 and the spatial data from the spatial sensor 200 are aligned via a calibration routine. This calibration routine is typically a factory calibration and involves overlaying the spatial data onto the image data (or vice versa). The overlay parameters are then adjusted until the data is aligned. In further forms, software may be used to automatically align the image data with the spatial data.

Figure 3:
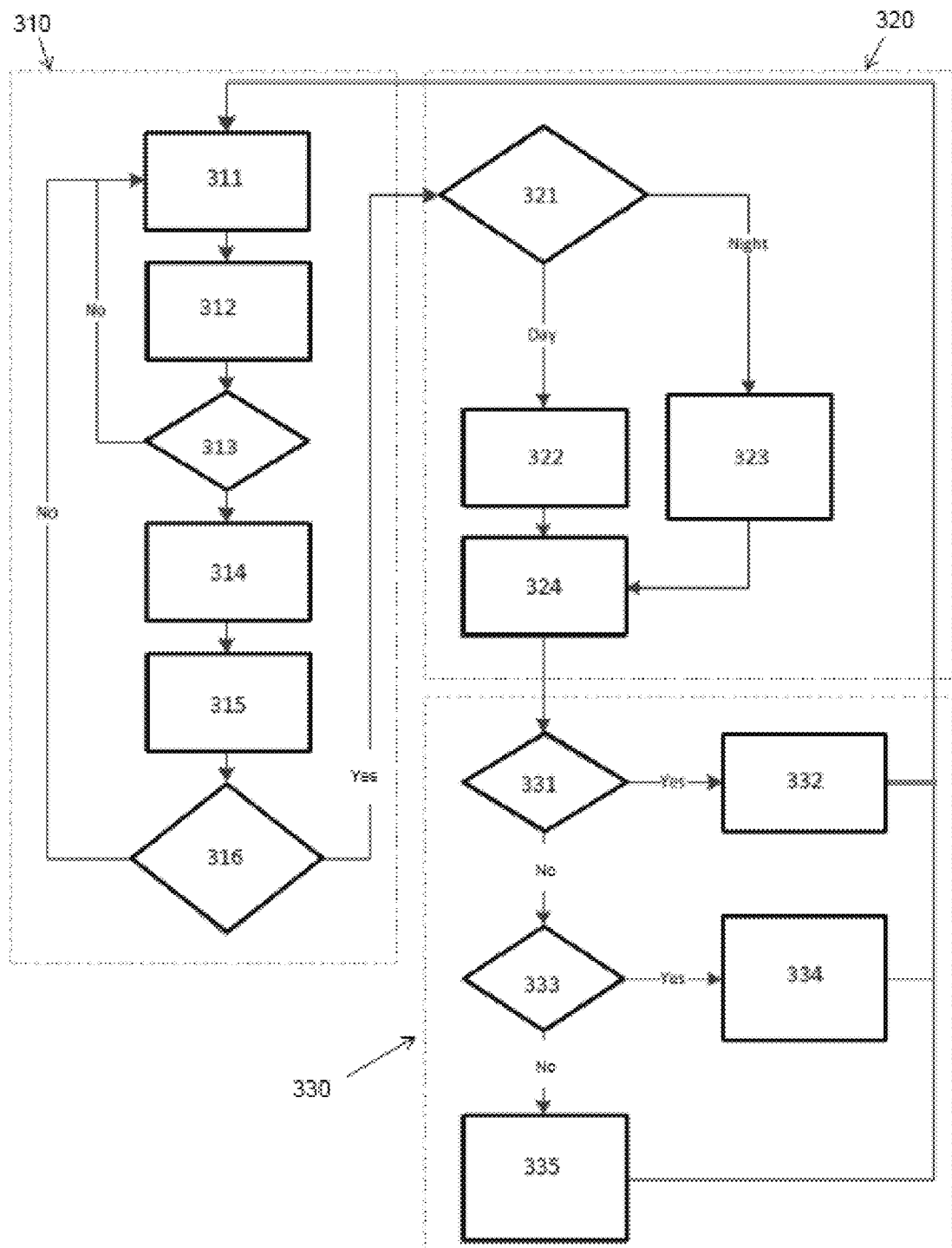
FIG. 3 illustrates a flow chart showing the process of collecting a bin, according to an embodiment of the invention.

In a first embodiment, the operations of processing module 300 are set out in FIG. 3. In this embodiment it will be understood that these operations provide a substantially fully-automated refuse collection process. In alternative embodiments, processing module 300 may operate in a semi-automated mode, where input or control from an operator (a driver of the refuse collection vehicle, or other personnel) is required, such as bin selection or confirmation step before a bin retrieval operation can be initiated.

As a first stage, processing module 300 is configured to undertake a bin identifying operation 310. This involves camera 100 communicating image data to processing module 300 (step 311), and the processing module 300 processing the image data by searching for a prescribed feature vector (step 312). In this regard, the image data can be converted into greyscale during this step. Greyscale is chosen to reduce the processing power required.

Furthermore, as will be understood, in pattern recognition techniques a feature vector is an n-dimensional vector of numerical features that represent an object, and enables facilitation of classification of the object. In this context, the prescribed feature vector is based on geometric and colour space features of the object. The feature vector is trained using machine learning to allow the detection algorithm to classify a region of the image as one in which an object of interest is or is not present.

At step 313, the processing module 300 uses a comparison algorithm to determine whether the prescribed feature vector corresponds to information in sub-regions of the image data, to provide a determination of whether the image data contains an object having the form of a bin. If no sub-region provides a good correlation, the process returns to step 311 to review further image data from camera 100. In an alternative embodiment, the processing module 300 may determine whether the image data contains an object having the form of a bin by using a convolutional neural network rather than feature vectors.

It will be appreciated that in an alternative embodiment, being a semi-automated mode, a user may assist in the determination process, by verifying a candidate postulate determined by the system. This is done by a user selecting a part of the image, e.g. touching a highlighted region on a touchscreen that has been determined by processing module 300 to contain a bin, if that region does indeed correlate with a bin, or rejecting the postulate. Furthermore, if a bin is present but the determination process fails, i.e. if the processing module 300 does not determine a candidate postulate, the user can nonetheless select an area of the image that contains the bin.

In response to determining that the prescribed feature vector is present in the image data, the processing module 300 retrieves the relevant captured spatial data from spatial sensor 200 (step 314), and the spatial data in a region associated with the object having the prescribed feature vector (i.e. the region determined to contain a bin in step 313) is processed by processing module 300 (step 315). In further embodiments, it will be appreciated that spatial data may be processed first or at the same time as the image data to assist in confirming that the object is a bin with the image data.

The processing of the spatial data allows characteristics of the object to be determined (including the position, orientation, dimensions of the object and other geometric features such as the lip of the bin), and based on comparing these characteristics with prescribed characteristics, processing module 300 confirms that the object is indeed a bin (step 316). This additional step of confirmation of determination of bin presence—based on characteristic information from the spatial data—provides markedly enhanced reliability, by significantly reducing the possibility of false positives. Furthermore, it would be appreciated that, for example, the prescribed characteristics may be established by machine learning, in a similar way to the prescribed image feature vector. In addition, in a further aspect the processing module 300 could search for a feature vector within the spatial data.

Separately, in an alternative embodiment, being a semi-automated mode, the process may again include an operator input step, allowing or requiring confirmation that the object is indeed a bin.

If the identified object is not confirmed as a bin, the process returns to step 311 to review further image data. In response to a positive determination of bin presence, processing module 300 determines the type of bin present by way of a classifying operation 320, which classifies the bin based on an aspect of its colour. To this end, processing module 300 determines whether the ambient light levels indicate whether it is day or night (step 321). This can be done by analysing the overall light levels captured by camera 100, or a separate PE sensor can be used.

If ambient light levels allow, the image data is converted into a hue, saturation, and value (HSV) image. Alternatively or in addition, a hue, saturation, and lightness (HSL) image or other colour space representation of the image may be used. The HSV image is established from the image data received from camera 100 having pixels defined by Red, Blue and/or Green characteristics (i.e. an RGB image). Classifying the type of bin is realised by looking for a sufficient match in the hue colour channel histogram to known hue value histograms for defined bin types. By way of example, the hue value of a bin lid may be used to assist in classifying the bin type. More preferably however, a hue colour channel histogram for the whole bin is used to classify the bin type. In this regard, the hue value is a characteristic of the colour of an object which is largely independent of shadowing of the object, ensuring that the object is classified in a reliable and repeatable manner in different environments and conditions. This analysis and determination step is represented as step 322. Advantageously, by classifying the bin type using a single colour space channel, the processing module 300 performs fewer computations and therefore will classify the bin type relatively sooner.

Under poor ambient lighting conditions (e.g. night), the work area is illuminated using an infrared light and the image data captured by the camera 100 is analysed as a greyscale image. A histogram of the greyscale intensities is generated for the region of the image that has been determined to contain a bin. Upon a sufficient match with known greyscale histograms for predefined bin types, the processing module 300 thereafter classifies the bin type. This analysis and determination step is represented as step 323.

Figure 4:
FIG. 4 illustrates a first image being a sample related to a portion of the image data in greyscale, and a second image being the same sample of a portion of the image data but being shown in the hue channel only.
Figure 4:
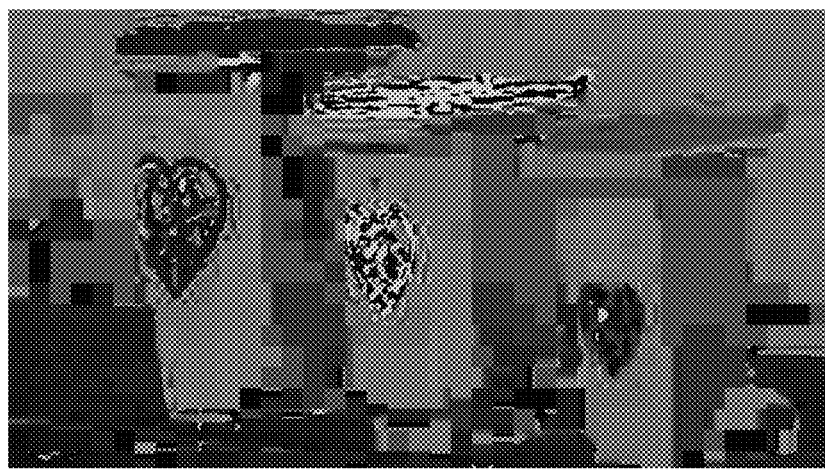

With further reference to step 323, FIG. 4 illustrates the effect of changing the image colour space of an image of 3 bins. As is illustrated, the top image in FIG. 4 is an image of the 3 bins in greyscale. The lower image is an image of the 3 bins using the Hue channel only. Accordingly, in addition to using the geometry of the bin to differentiate therebetween, a histogram of intensities of the greyscale channel or any other selected colour space channel can be used for classifying the bin type.

As an optional step, step 324, in response to classifying the type of bin present, the processing module 300 provides suitable information on a user interface allowing confirmation by a user of the bin type. For example, the user may touch on a touchscreen an indicia on the image of the bin that represents the bin type, such as an outline of the bin in the colour determined by classifying operation 320. This optional step 324 assists in avoiding false positives, where an operator may have incorrectly confirmed a bin is present when verifying a candidate postulate determined by the system. Alternatively, it will be appreciated that the bin type for collection may be preselected at an earlier point in time. If the operator determines that the bin identification operation 310 has made an error in identifying a bin, a snapshot of the image data and the spatial data may be stored for later re-training of the object detection algorithm.

Classifying of the bin assists in ensuring that i) the correct bin is collected for the refuse collection vehicle (e.g. that a recycle bin is collected for a vehicle collecting recycled waste and not general waste); or ii) the bin is moved to dispose of rubbish in a correct part of a waste container (e.g. that recycle waste is delivered to a recycle portion of the container whilst general waste is delivered to another portion of the container).

Once the bin has been identified and classified, a bin retrieval operation 330 is realised. This commences with a determination of whether a direct path to the bin is clear, based on the relevant spatial data (and or the image data) (step 331), to decide whether the bin-collecting device can safely take that path to engage with the bin without interference from another object. If the direct path is clear, processing module 300 passes bin position, orientation, type, size and path information to bin retrieval control module 400 (step 332). The path information takes the form of a motion profile to be used by bin retrieval control module 400 in operating the bin-collecting device, and takes into account the degrees of freedom and/or extension of members available to the bin-collecting device 450. Alternatively, the determination of the motion profile may be carried out by module 400, based on the information received.

Bin retrieval control module 400 then activates the bin-collecting device 450 and uses the motion profile to carry out a bin retrieval operation. With this in mind, the bin retrieval control module 400 also utilises the bin size communicated to suitably position the grabbing arms of the bin-collecting device 450 for quick bin collection.

If it is determined that the bin-collecting device cannot safely take a direct path to engage the bin, processing module 300 determines or selects an alternative path to the bin, based on the spatial data (and/or the image data) and the available range of motion of the bin-collecting device (step 333). Based on this, an appropriate motion profile is calculated, and the interoperation with bin retrieval control module 400 as described above is realised (step 334), leading to activation of the bin-collecting device 450 to carrying out a bin retrieval operation.

As will be understood by the skilled reader, bin retrieval control module 400 may be a separate module to processing module 300, or may be integrated therewith to carry out the operations of the system. In other words, all the processing associated with the bin identification and position/type determination and the bin retrieval control operation may be centralised, along with other aspects of operation of the refuse collection vehicle, if appropriate.

If a safe path for the bin-grabbing device 450 cannot be determined, this is passed on to bin retrieval control module 400, preventing operation of the bin-collecting device 450 in an automated manner. A suitable alert is provided to the driver at step 335, who may then take appropriate action, in particular by moving the bin or by moving the vehicle, to allow a clear path to the bin to be established.

During the bin retrieval operation, once a bin has been picked up and its contents emptied, the refuse collection system 10 checks whether and how far the vehicle 350 has moved since bin pickup up and/or checks that the path to bin drop off is still clear. If the bin-collecting device 450 is able to return the bin to its pickup position and the path is determined to be clear, then the bin is returned to its pickup position. If, however, the vehicle has moved a distance which puts the reach of the bin-collecting device out of range, or the path to dropoff is determined not to be clear, then the bin must be replaced on the kerbside or roadside at a different location. All this can be determined by bin retrieval control module 400, taking into account information received from processing module 300. It will thus be understood that the motion profile of the bin-collecting device 450 can be modified during a bin retrieval operation.

The system can be configured such that, when the bin-collecting device 450 is operating, the refuse collection vehicle 350 is limited to a very low speed. In this regard, the controller 300 may be in communication with other control aspects of the refuse collection vehicle 350.

By processing the image data and the spatial data to determine the presence of a bin, a robust system is provided that substantially reduces the risk of false detections of bins. In this regard, using feature vectors or a convolutional neural network allows the image data to be quickly analysed to determine if a bin is potentially present. This assists with the processing time of the system which needs to cope with detecting bins in real-time. By analysing spatial data or image data, a confirmation of the bin presence determination is provided, and the spatial data is also used to determine the location, geometry and orientation of any detected bin along with a path to the bin, providing for the effective and efficient retrieval of the bin by avoiding surrounding obstacles.

It will also be appreciated that there are a number of different methods of classifying objects in image data. These include but are not limited to Haar Classifiers, Support Vector Machines, and Neural networks. With this in mind and as outlined above, an image may be represented as an N-dimensional array of numbers and, therefore, the method of classification within a visual image can also be applied to spatial data which is also an N-dimensional array. The optimum choice of object classification technique is purely dependent upon the processing power available (on board a vehicle), and as processing power becomes more readily available in the future, this method will likely use increasingly complex modes of identification that require more computation power.

The system 10 is also able to differentiate bin types at night by using either visible and/or infrared light source. In particular, when using a visible light source, as outlined above, the refuse collection system 10 may define a bin according to its Hue as opposed to, for example, the colour of a bin lid. This overcomes potential problems associated with image data having different RGB values under good lighting conditions in comparison to poor lighting conditions.

The system 10 can also determine an optimal safe path to pick up and/or drop off the bin. In addition, the automated mode(s) provide a means to increase productivity and reduce emissions and wear of mechanical components by allowing the vehicle to pick up bins without having to stop for every operation.

Figure 5:
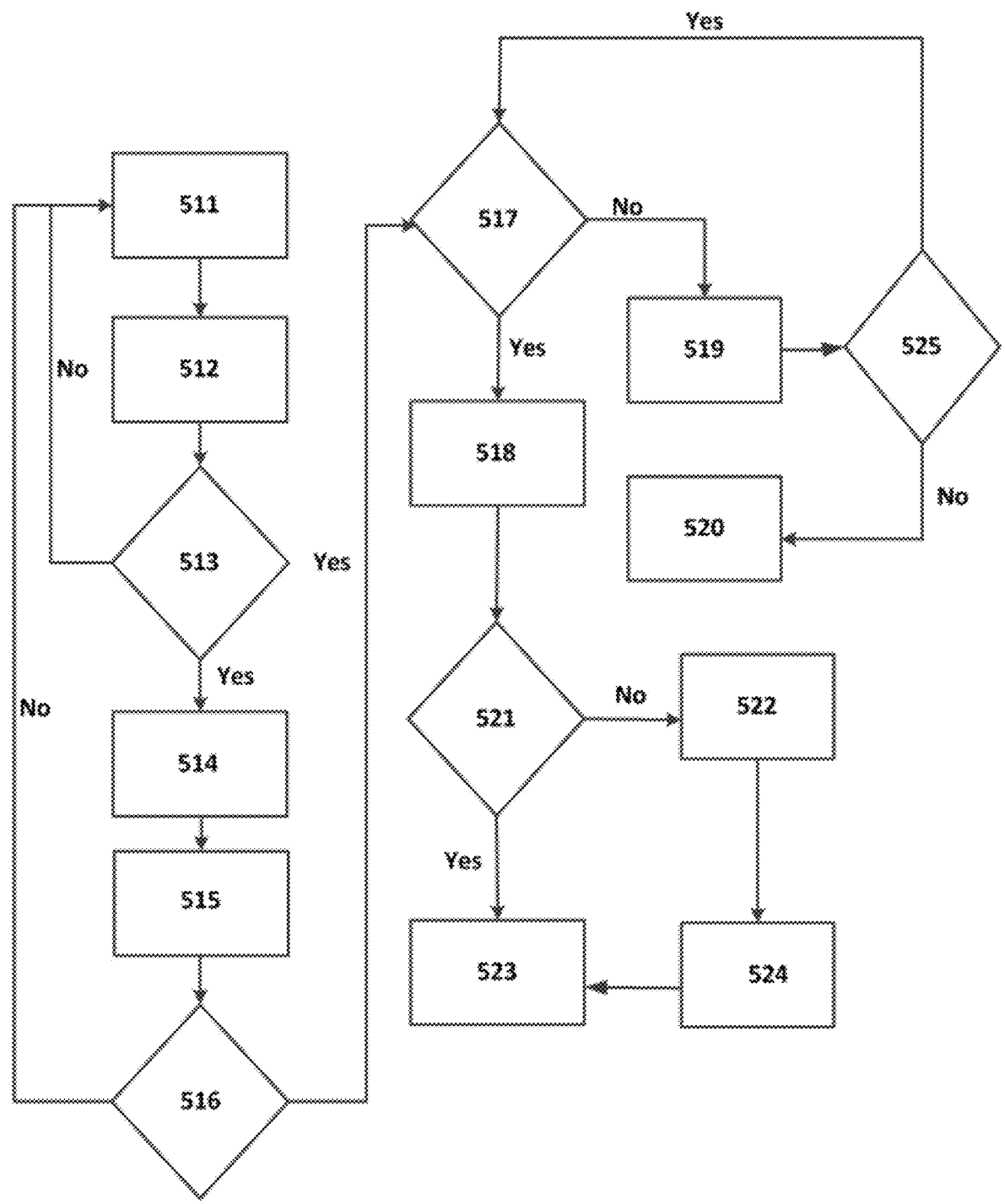
FIG. 5 illustrates a flow chart showing an alternative process of collecting a bin, according to a preferred embodiment of the invention.

In a second and preferred embodiment, the operations of processing module 300 are set out in FIG. 5. In this embodiment, it will be understood that these operations provide a substantially fully-automated refuse collection process. In alternative embodiments, processing module 300 may operate in a semi-automated mode, where input or control from an operator (a driver of the refuse collection vehicle, or other personnel) is required, such as bin selection or confirmation step before a bin retrieval operation can be initiated.

As a first stage, processing module 300 is configured to undertake a bin identifying operation. This involves camera 100 communicating image data and spatial sensor 200 communicating spatial data to processing module 300 (step 511). The processing module 300 thereafter processes the image data by searching for one or more prescribed objects in the image data using an object detection algorithm (step 512).

As will be understood, in computer vision techniques a convolutional neural network is an algorithmic method of defining an object classifier. The network is trained to classify objects by iteratively feeding a batch of data forward through the network and then using back propagation to adjusts weights and biases associated with each neuron dependent upon the forward pass performance when compared to pre-labelled training data. The network may have more than one output corresponding to different object classes, for example different bin types or other objects of interest. After training the network, the weights and biases which provide the best performance are chosen to be used as frozen weights and biases in the production version of the convolutional neural network used in step 512. In use, image data captured by the camera 100 is passed forward through the neural network and upon the neural network recognising a pattern in the image data as an object that it has been trained to identify, the neural network outputs the image coordinates of the object location, the object class, and a confidence associated with the detection.

The processing module 300 uses the abovementioned object detection algorithm to determine whether a detected class of object, i.e. a bin type or other object, is detected with sufficient confidence within the image data (step 513). If an object is not detected with sufficient confidence, the process returns to step 511 to further review the image data from the camera 300 until a bin is found.

In response to determining that a bin class is present with sufficient confidence in the image data, the processing module 300 retrieves location data contained in the image data corresponding to the location of the detected bin (step 514). The processing module 300 processes the image location data to determine an angular distance to the bin. The processing module 300 thereafter retrieves the spatial data captured from spatial sensor 200 in step 511, and processes the spatial data in a region associated with the bin (step 515) to determine various characteristics of the bin, as is explained below.

The processing of the spatial data allows characteristics of the bin to be determined (including the position, orientation, and dimensions of the bin along with other geometric features such as the lip of the bin), and based on comparing these characteristics with prescribed characteristics, processing module 300 confirms that the object is indeed a bin (step 516). The processing of the spatial data is also used to determine if an obscuration in the image data is merely, for example, non-standard markings on the bin, such as stickers or a house number associated with the bin, or more importantly, if the obscuration is an obstruction in front of the bin, for example, a car or bin bag. In an alternative embodiment, being a semi-automated mode, the process may again include an operator input step, allowing or requiring confirmation that the object is indeed a bin. If the identified object is not confirmed as a bin, the process returns to step 511 to review further image data and spatial data.

As is mentioned above in relation to the embodiment shown in FIG. 3, this additional step of confirmation of determination of bin presence—based on characteristic information from the spatial data—provides markedly enhanced reliability, by significantly reducing the possibility of false positives and false negatives.

After confirming that a bin is present (step 516), the processing module 300 processes the spatial data in the region associated with the bin to confirm that a path to the bin is clear (step 517). In this step, the processing module 300 creates a map of objects surrounding the bin to confirm that the path to the bin is clear. Furthermore, data pertaining to the geometry of the bin is used to determine an optimal path to the bin for retrieval by the bin-collecting device. If the path to the bin is not clear, for example, if objects are present that would prevent a safe retrieval of the bin, an audio and/or visual alert is activated in an operating compartment of the refuse collection vehicle 350 (step 519). Thereafter, the refuse collection vehicle 350 may be moved to another location by the operator in order to locate a clear path to the bin (step 525). As the vehicle moves, the processing module 300 tracks the bin and surrounding objects/obstacles to determine when the path to the bin is clear (return to step 517). If no clear path is determined and the vehicle is not moved, the bin retrieval operation is handed over to the operator for manual operation of the bin-collecting device (step 520).

If the path to the bin is clear, the bin is highlighted on the display according to its determined type (step 518), i.e. a different highlight is applied for different bin types to assist the operator in visually confirming the determined bin type on the display. After the identified bin is highlighted on the display according to its determined bin type, operator input is required to confirm that the highlighted bin is of the correct type to be collected by the refuse collection vehicle 350 (step 521).

Confirmation of the determined bin type by the operator assists in ensuring that i) the correct bin is collected for the refuse collection vehicle 350 (e.g. that a recycle bin is collected for a vehicle collecting recycled waste and not general waste); or ii) the bin is moved to dispose of rubbish in a correct part of a waste container (e.g. that recycle waste is delivered to a recycle portion of the container whilst general waste is delivered to another portion of the container); or iii) that the bin collecting device is only operated at a time that is confirmed to be safe by the operator.

If the operator confirms that the highlighted bin is not of the correct type to be collected by the refuse collection vehicle 350, for example, by providing an input to the user interface, then a snapshot of the image data and the spatial data captured in step 511 is stored (step 522) with the aim of improving the bin identification system. The operator may thereafter manually select the correct bin to be collected by providing an input to the user interface, for example, by touching a region on the display that displays the correct bin (step 524). Thereafter, a bin retrieval operation is realised (step 523) as is described below.

If the operator confirms that the highlighted bin is of the correct type to be collected by the refuse collection vehicle 350 by providing an input to the user interface, then the bin retrieval operation is realised (step 523). The steps associated with the bin retrieval operation may be the same as described above in relation to the first embodiment set out in FIG. 3.

The second embodiment of the operations of the processing module 300 set out in FIG. 5 may also include any one or more other operations described above in relation to the first embodiment set out in FIG. 3.

As will be appreciated, the system and method of the invention is designed to operate with conventional bins, as it does not require any modification of bins in order to determine bin presence and identify the characteristics needed for the bin retrieval operation.

In this specification, adjectives such as left and right, top and bottom, first and second, and the like may be used to distinguish one element or action from another element or action without necessarily requiring or implying any actual such relationship or order. Where context permits, reference to a component, an integer or step (or the like) is not to be construed as being limited to only one of that component, integer, or step, but rather could be one or more of that component, integer or step.

The above description relating to embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art from the above teaching. Accordingly, while some alternative embodiments have been discussed specifically, other embodiments will be apparent or relatively easily developed by those of ordinary skill in the art. The invention is intended to embrace all modifications, alternatives, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may include other elements not listed.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A refuse collection system including:
    a camera configured to capture image data;
    a sensor configured to capture spatial data, said captured spatial data including 3D information; and
    a processor in communication with the camera and the sensor, the processor configured to:
        process the image data to assist in identifying an object; and
        process the spatial data in a region associated with the object in order to determine one or more characteristics associated therewith,
        wherein, in response to confirming that the object is a bin based on the one or more characteristics associated with the object, the processor is configured to create a 3D map of the bin and surrounding objects using the spatial data and thereby provide information to assist in retrieving the bin with a bin collector.

2. The refuse collection system of claim 1, wherein the processor is configured to process the image data by passing the image data through an object detection algorithm configured to assist in identifying the object.

3. The refuse collection system of claim 2, wherein the object detection algorithm is configured to compare the image data with one or more prescribed features, and, in response to the image data providing a sufficient match with the one or more prescribed features, the processor is configured to determine that the object is a bin.

4. The refuse collection system of claim 1, wherein the processor is further configured to present to a user a selectable representation associated with the identified object on a user interface, which selectable representation is selectable by the user to confirm that the object is a bin.

5. The refuse collection system of claim 1 wherein, in order to confirm that the object is a bin based upon the one or more characteristics associated with the object, the processor is configured to compare the one or more characteristics with one or more prescribed characteristics.

6. The refuse collection system of claim 5 wherein, in response to determining that the one or more characteristics have a sufficient match with the one or more prescribed characteristics, the processor is configured to confirm that the object is a bin.

7. The refuse collection system of claim 1, wherein the processor is further configured to determine the type of bin.

8. The refuse collection system of claim 7, wherein the type of bin is determined based upon any one or more of the following: a shape of the bin, a colour of the bin, and a size of the bin.

9. The refuse collection system of claim 1, wherein the one or more characteristics associated with the object include one or more geometrical features of the bin and/or a position of the bin.

10. The refuse collection system of claim 9, wherein, based on the position of the bin, the processor is configured to determine information concerning a path to the bin for movement of the bin collector to retrieve the bin.

11. The refuse collection system of claim 10, wherein the processor is configured to use the image data and/or the spatial data to determine the presence of an obstacle in the path of the bin collector to the bin.

12. The refuse collection system of claim 11 wherein, in response to determining that the path of the bin collector to the bin is not clear, the processor is configured to determine or select an alternative path for the bin collector to retrieve the bin.

13. The refuse collection system of claim 12 wherein, in the event that the processor is unable to determine a clear path to the bin for movement of the bin collector to retrieve the bin, the bin retrieval control module is prevented from carrying out the bin retrieval operation.

14. The refuse collection system of claim 10, wherein the processor is configured to determine a safe path for the bin collector to retrieve the bin.

15. The refuse collection system of claim 9, wherein the processor is configured to provide information relating to the position of the bin to a bin retrieval control module to be used in a bin retrieval operation.

16. The refuse collection system of claim 15, wherein the processor is configured to provide a motion profile to the bin retrieval control module, based on a path to the bin, in order to control movement of the bin collector in the bin retrieval operation.

17. The refuse collection system of claim 1, wherein the sensor is further configured to capture the spatial data in two or more dimensions, and wherein the sensor comprises any one or more of the following: a stereo camera, a laser scanner, a RADAR unit, a LIDAR unit, and an echolocation unit.

18. A refuse collection vehicle including:
    a refuse collection device having a bin collector configured to collect a bin; and
    a refuse collection system as defined in claim 1.

19. A refuse collection system including:
    a camera configured to capture image data;
    a sensor configured to collect spatial data, said collected spatial data including 3D information; and
    a processor in communication with the camera and the sensor, the processor configured to:
        process the image data in order to assist in identifying an object;
        determine a region associated with the object; and process the spatial data in the region associated with the object in order to determine one or more characteristics associated therewith, wherein, in response to confirming that the object is a bin, the processor is configured to create a 3D map of the bin and surrounding objects using the spatial data and assist in retrieving the bin based on the one or more characteristics associated with the object.

20. A method for collecting a bin, the method including:

capturing image data from a zone where a bin may be present;

capturing spatial data for said zone where a bin may be present, said captured spatial data including 3D information;

processing the image data to assist in identifying an object;

processing the spatial data in a region associated with the object in order to determine one of more characteristics associated therewith to assist in confirming that the object is a bin;

creating a 3D map of the bin and surrounding objects using the spatial data; and providing information to assist with retrieving the bin with a bin collector.

21. A refuse collection vehicle including:

a refuse collection device having a bin collector configured to collect a bin; and a refuse collection system as defined in claim 19.

\* \* \* \* \*